March 23, 1965  F. K. H. NALLINGER ETAL  3,174,793
SLIDABLE ROOF CONSTRUCTION
Filed Aug. 25, 1960  2 Sheets-Sheet 1
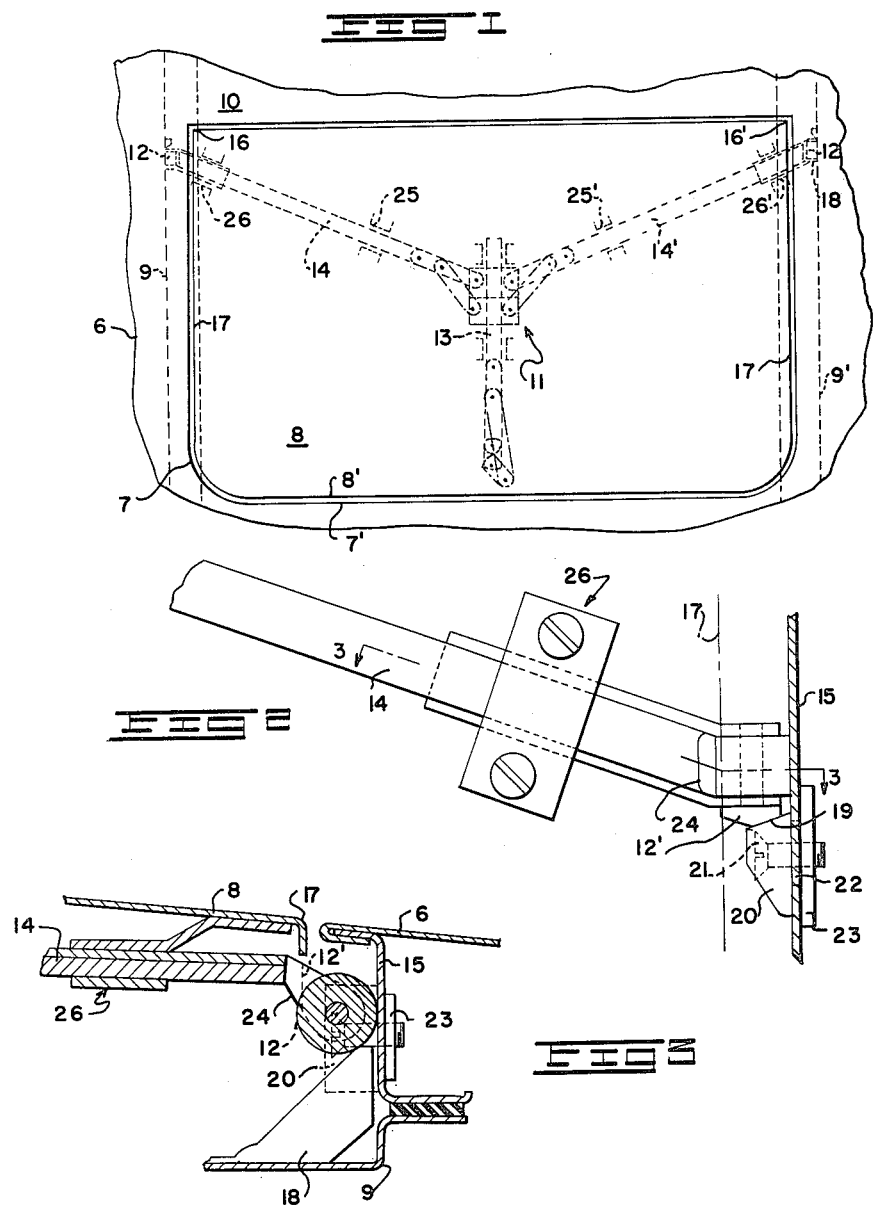
INVENTOR
FRIEDRICH K.H. NALLINGER
GÜNTER GMEINER
BY Dicke, Craig & Freudenberg
ATTORNEYS March 23, 1965   F. K. H. NALLINGER ETAL   3,174,793
SLIDABLE ROOF CONSTRUCTION
Filed Aug. 25, 1960   2 Sheets-Sheet 2
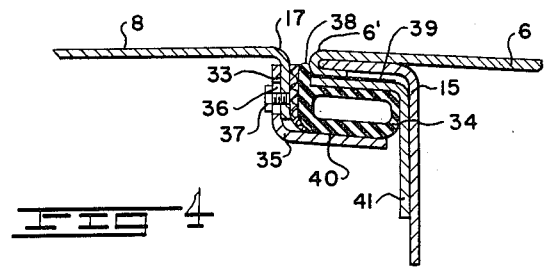
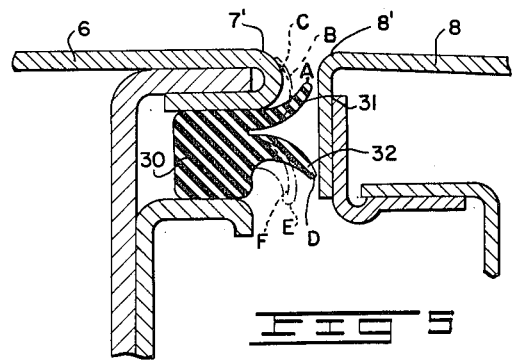
INVENTOR
FRIEDRICH K. H. NALLINGER
GÜNTER GMEINER
BY Dicke, Craig & Freudenberg
ATTORNEYS United States Patent Office 3,174,793
Patented Mar. 23, 1965

3,174,793
SLIDABLE ROOF CONSTRUCTION
Friedrich K. H. Nallinger, Stuttgart, and Günter Gmeiner, Sindelfingen, Kreis Boblingen, Germany, assignors to Daimler-Benz Aktiengesellschaft, Stuttgart-Unterturkheim, Germany
Filed Aug. 25, 1960, Ser. No. 51,989
Claims priority, application Germany, Aug. 28, 1959, D 31,384
3 Claims. (Cl. 296—137)

The present invention relates to an installation for closing and sealing slidable roofs in vehicles, especially in motor vehicles, in which an opening of the roof is adapted to be closed by means of a roof insert adapted to be displaced within a guide frame, whereby transversely displaceable closure rods or locking bars are arranged at the roof insert by means of which the roof insert may be fastened or secured within the guide frame in both end positions thereof as well as also in any desired intermediate position thereof.

In the known slidable roof constructions of the prior art, the opening of the usually rectangular roof aperture takes place by means of a lowering of the rear part of the roof insert, caused by manual rotation of a handle, onto a pair of guide rails extending rearwardly. The handle in these prior art devices is thereby operatively connected in a crank-like manner with a rod disposed approximately in the center of the roof insert and adapted to be displaced in the longitudinal direction, the movements of which are thereupon transmitted to transversely displaceable closure rods or locking bars which support, at the ends thereof, sliding roller members. Upon displacement of the closure rods or locking bars, the sliding roller members move along inclined surfaces of abutment wedges arranged at the guide frame, whereby, during opening, the roof insert is lowered from the plane of the roof or, during closure, is lifted into the plane of the roof.

Notwithstanding the provision of purposeful seals between the edges of the roof aperture and the roof insert, in order to avoid the annoying penetration of air-drafts, dust, dampness and moisture, it is not possible with the known slidable roof constructions and guide arrangements to assure a complete and lasting seal because of the relative mutual displacements, dislocations and disalignments occurring during operation and by reason of the seasonally conditioned climatic changes. Also, especially during the drive on uneven and bumpy roads or after several rapid stops, oftentimes a small change occurs in the distance between the forward rim of the roof aperture and the forward edge of the roof insert which forms the cause for the occurrence of unpleasant and annoying wind noises at this place.

Furthermore, difficulties arise in the lateral seal between the edges of the roof insert and the edges of the roof aperture as an abutment pressure against the lateral surfaces of the latter is not possible. Further disadvantages result from drying and/or settling of the sealing rubber strips at the lateral sealing surfaces, if the height of the roof is not to undergo any changes.

Furthermore, it was not possible up to the present invention, to disassemble the roof insert in case of repairs, for example, for purposes of exchanging the seals, except in a downward direction which readily led in the prior art devices to damage of the inner covering material or fabric of the vehicle roof.

A further disadvantage of the prior art constructions consisted in the relatively large force which is necessary in these constructions for the displacement of the parts of the known locking mechanisms for slidable roofs, as an unfavorable transmission of the locking forces takes place therein.

Additionally, in the known constructions of the prior art, the rear edges of the roof aperture are damaged in due course, partly by the air stream suction and partly by the rattle movements of the roof insert caused or at least favored by displacements of the structural parts.

The present invention has posed itself the task to eliminate the aforementioned disadvantages, and essentially consists in the fact that the transverse locking movement of the closure rods or locking bars takes place with a component directed oppositely to the closure movement of the roof insert.

Accordingly, it is an object of the present invention to provide a slidable roof construction for vehicles, especially motor vehicles, which eliminates the inadequacies and disadvantages encountered in the prior art constructions.

It is another object of the present invention to provide a guide and closure arrangement for a slidable roof in motor vehicles which assures a reliable and safe sealing along all the edges notwithstanding seasonal climatic changes.

Still another object of the present invention resides in the provision of a closing and opening mechanism for slidable roofs in vehicles which requires relatively small operating forces and assures a long life of the parts and in the proper operation thereof, especially insofar as proper closing and sealing are concerned.

Still a further object of the present invention resides in the provision of a slidable roof construction which permits ready exchange of damaged or worn seals by disassembling the slidable roof in a direction perpendicular to the plane of the roof without endangering the fabric or material covering the remainder of the inside of the vehicle roof.

Still a further object of the present invention resides in the provision of a closure and locking mechanism for a slidable roof which assures that the slidable roof is retained in the closed position to avoid, for example, undesired and annoying wind noises due to an inadvertent, automatic slight opening in the roof as a result of jars that may occur while driving of the vehicle.

A still further object of the present invention resides in the provision of a slidable roof construction for vehicles in which the unfavorable effects of settling of the sealing strips are eliminated or minimized.

These and other objects, features and advantages of the present invention will become more obvious from the following description, when taken in connection with the accompanying drawing which shows, for purposes of illustration only, one embodiment in accordance with the present invention, and wherein:

FIGURE 1 is partial top plan view of a slidable roof for a motor vehicle in accordance with the present invention in which the unlocked closure mechanism is indicated in dash lines;

FIGURE 2 is an enlarged elevational view, taken from within the vehicle, of the closure mechanism of the slidable roof of FIGURE 1;

FIGURE 3 is a cross-sectional view taken along line 3—3 of FIGURE 2;

FIGURE 4 is an enlarged cross-sectional view through a lateral seal of the slidable roof in accordance with the present invention; and FIGURE 5 is an enlarged cross-sectional view through the front seal of a slidable roof in accordance with the present invention in which the sealing lips in the position thereof, shown in full line, are not exposed as yet to any abutment pressure by the sealing edge of the roof insert, whereas the dash line position of the sealing lips illustrates the two phases of closure.

Referring now to the drawings, wherein like reference numerals are used throughout the various views to designate like parts, reference numeral 6 designates the roof of a motor vehicle which is provided in the forward region thereof with a rectangular aperture 7 (FIGURE 1) adapted to be closed by means of a roof insert 8. The roof insert 8 is displaceably arranged along guide rails 9 and 9′ and slides during opening along the same below the stationary part 10 of the roof 6. The displacement mechanism of the roof insert 8 consists of a handle (not illustrated) rotatably supported at the underside of the roof insert 8 and of a suitable linkage generally designated by reference numeral 11 (FIGURE 1) actuated by the handle.

The linkage 11 itself is composed of a rod 13 guided within the center of the roof insert 8 and adapted to be displaced in the vehicle longitudinal direction and of locking bars or closure rods 14 and 14′ extending obliquely to the rod 13 the ends of which facing the rod 13 are operatively connected therewith by suitable pivotally connected shackles and the other ends 24 of which (FIGURES 2 and 3) are provided with sliding roller members 12, preferably consisting of rubber or similar material. Immediately at the height of the lateral edges 17 of the roof insert 8, the end 24 of each locking rod 14 and 14′, which is constructed thereat in a two-partite manner, is angularly bent transversely to the vehicle longitudinal direction so that each sliding roller member 12 rests with the full width thereof on the guide frame 15 when displaced against the respective ramp-type abutment wedge 18 (FIGURE 3) by the corresponding locking bars or rods 14 and 14′ thereof.

The ends 24 of the locking bars or rods 14 and 14′ are provided with pressure wedge portions 12′ at the sides thereof facing the corners 16 and 16′ (FIGURE 1) of the roof insert 8. The surfaces of the pressure wedge portions 12′ are supported, during movement of the sliding roller members 12 along the wedging members 18, against wedge-shaped surfaces 19 (FIGURE 2) of a wedge-shaped abutment 20 (FIGURES 2 and 3), each secured directly behind the wedging member 18 at a respective lateral guide rail 9 and 9′. The abutment 20, preferably consisting of synthetic material, is adjustably secured at the guide rail 15 by means of a recessed screw 21 (FIGURE 3) extending into a longitudinal slot 22 and engaging with a counter-plate 23 provided with a threaded bore.

The locking rods 14 and 14′ displaceably arranged at the roof insert 8 are guided within U-shaped guide bow members 25, 26, 25′ and 26′.

For purposes of sealing the space between the edge 7′ of the roof aperture 7 and the forward edge 8′ of the roof insert 8 (FIGURES 1 and 5), a sealing strip 30 of soft rubber is inserted into the roof reinforcing frame, which sealing strip 30 is provided with two oppositely directed spread-apart lips 31 and 32.

During closing of the roof insert 8, sealing between the edges 7′ and 8′ takes place in two phases. Initially, the roof insert 8, after the same has been pulled out from under the rear part 10 of the roof 6 and has been brought into the area of the roof aperture 7, and after the sliding roller members 12 are displaced by means of the locking rods 14 and 14′ onto the wedging portions 18, whereby the roof insert 8 is lifted up to the plane of the roof 6, is pulled up completely against the sealing lips 31 and 32 of the sealing strip 30 by the wedging effect caused by the locking rods 14 and 14′ through the pressure wedge portions 12′ at the abutments or thrust bearings 20. The sealing lips 31 and 32 are pressed by the forward edge 8′ with a slight pressure against the sealing edge 7′ which is indicated in FIGURE 5 by the positions A–B and D–E of the sealing lips 31 and 32, respectively. During the second phase of the closure and sealing operation, during which the forward movement of the roof insert 8 takes place as a result of the oblique arrangement of the locking rods 14 and 14′ as a result of which only a relatively slight displacement distance is achieved conditioned by the locking rods subjected to tension, the sealing lip 31 is further compressed by a slight amount (see position C thereof) while the sealing lip 32 is pressed against the sealing strip 30 (see position F thereof) with the surface of the sealing lip 32 which faces the sealing strip 30 joining the surface of the sealing strip. Notwithstanding the small displacement distance traversed by the roof insert during this closing operation, a relatively large abutment pressure will result therefrom since the ends 24 of the locking rods 14 and 14′ abut against the stationary guide rails 9 and 9′, while the roof insert 8 is displaced forwardly and is pressed thereby against the sealing lips 31 and 32 of the sealing strip 30. This is so as the roller members 12 are displaced during the closure movement upwardly along the wedge surfaces 18. These wedging surfaces 18 which extend rearwardly from the abutment 20 are rigidly connected with the guide rails 9 and 9′ so that, upon displacement of the roller members 12 in the uppermost position thereof, as shown in FIGURE 3, the entire pressure of the roof insert is transmitted throughout the wedging surfaces 18 to the guide rails 9 and 9′. A relative movement in the longitudinal direction of the vehicle occurs thereby between the locking rods 14 and 14′ and the roof insert 8.

During the closure movement of the roof insert 8 which is followed by the force-locking connection between the pressure wedge portions 12′ and the abutments 20, the roof insert 8, which is provided along the lateral edges 17 thereof with angularly bent flanges 33, is guided along the lateral sealing body members 34 (FIGURE 4). A guide rail 35 consisting of an angle iron is adjustably arranged at the flange 33, itself extending over the entire length of the roof insert 8; the guide rail 35 is thereby adapted to be adjusted by means of elongated apertures 36 and screws or bolts 37 extending therethrough, possibly also in a position thereof deviating from the horizontal in the vehicle longitudinal direction. Since in practice no abutment pressure is feasible against the lateral surface of the lateral sealing body member 34, which consists of a hollow sealing ledge member provided with a sealing nose portion 38, whereby a cover strip 39 made, for example, of a cotton fabric, is provided from the latter in the direction toward the guide frame 15, and since for reasons of the required ease of movement of the roof insert 8 during displacement thereof, the lateral fabric or plush seal provided at the sealing body member 34 cannot abut too tightly against the flange 33, a lateral seal is achieved by the fact that an abutment pressure is obtained along the sealing surface 40, possibly also aided by an inclination of the guide rail 35, during closure and sealing operation. By reason of the adjustability of the guide rails 35, the vertical abutment pressure against the sealing body member 34 may be suitably selected up to a predetermined maximum force.

The use of the guide rail 35 further provides the feature of positioning or locating the sealing body member 34 in such a manner that, by means of readjustment thereof, the proper position of the roof insert 8 may be assured without having to change the height thereof by any other means.

By reason of the ready removability of the guide rail 35 from the roof insert 8, it is further possible to disassemble the roof in an upward direction without damaging the inner covering material or fabric of the vehicle roof.

Additionally, all paint and edge damages to the rear roof aperture, which have occurred heretofore during the opening and closing movements of the roof insert, are effectively avoided by the arrangement in accordance with the present invention.

While we have shown and described one embodiment in accordance with the present invention, it is understood that the same is not limited thereto but is susceptible of many changes and modifications within the spirit and scope of the present invention, and we, therefore, do not wish to be limited to the details shown and described herein but intend to cover all such changes and modifications as are encompassed by the scope of the appended claims.

We claim:

1. An arrangement for locking and sealing slidable roofs in vehicles, especially motor vehicles provided with roof means having a roof aperture and with a roof insert for closing said roof aperture, said roof aperture having a sealing edge provided with sealing means, guide frame means for said roof insert including lateral guide rails extending essentially in the longitudinal direction of the vehicle on both sides of said roof aperture, control means for securing said roof insert in said aperture in a closed position in which the forward edge of said roof insert is in sealing engagement with said sealing means, said control means including movable locking rods disposed obliquely relative to said guide rails, said locking rods having forked ends adjacent said guide rails, said forked ends being bent transversely to the vehicle longitudinal direction, U-shaped guide bow members secured to said roof insert and slidably receiving said locking rods, said U-shaped members extending obliquely with respect to said guide rails, and cooperating means on said forked ends and on said guide frame means operable upon movement of said locking rods to move said roof insert to said closed position, and means for maintaining said roof insert in said closed position comprising cooperating wedging means for said locking rods including pressure wedge portions on said forked ends and wedge shaped abutment members on said guide frame means.

2. An arrangement according to claim 1, wherein said sealing means comprise a sealing strip of soft rubber, said sealing strip being provided with two oppositely directed spread-apart lips.

3. An arrangement according to claim 1, wherein said guide frame means are provided with flange means, said roof insert being provided with a flange at each lateral edge thereof, an angle iron secured to said flange and with said flange means defining a space, a hollow plush sealing strip disposed in said space in contact with said flange means and said angle iron, said plush sealing strip being provided with a sealing nose portion extending upwardly therefrom, and a cover strip of cotton fabric in contact with said flange means, said cover strip extending from said nose portion toward said guide frame means.

References Cited in the file of this patent

UNITED STATES PATENTS

| 2,628,117 | Robinson | Feb. 10, 1953 |
| 2,661,234 | Bishop | Dec. 1, 1953 |
| 2,968,514 | Golde | Jan. 17, 1961 |
| 3,075,806 | Gmeiner et al. | Jan. 29, 1963 |

FOREIGN PATENTS

| 1,084,586 | Germany | June 30, 1960 |
| 746,608 | Great Britain | Mar. 14, 1956 |
| 751,332 | Great Britain | June 27, 1956 |